United States Patent
Romme

(10) Patent No.: US 10,928,495 B2
(45) Date of Patent: Feb. 23, 2021

(54) METHOD FOR DISTANCE DETERMINATION

(71) Applicant: Stichting IMEC Nederland, Eindhoven (NL)

(72) Inventor: Jac Romme, Schiedam (NL)

(73) Assignee: STICHTING IMEC NEDERLAND, Eindhoven (NL)

( * ) Notice: Subject to any disclaimer, the term of this patent is extended or adjusted under 35 U.S.C. 154(b) by 307 days.

(21) Appl. No.: 16/224,124

(22) Filed: Dec. 18, 2018

(65) Prior Publication Data
US 2019/0187263 A1    Jun. 20, 2019

(30) Foreign Application Priority Data

Dec. 20, 2017    (EP) .................................... 17209014

(51) Int. Cl.
| | |
|---|---|
| G01S 11/08 | (2006.01) |
| G01S 11/06 | (2006.01) |
| G01S 11/02 | (2010.01) |
| G01S 5/02 | (2010.01) |
| H04B 17/318 | (2015.01) |

(Continued)

(52) U.S. Cl.
CPC .............. G01S 11/08 (2013.01); G01S 11/02 (2013.01); G01S 11/06 (2013.01); G01S 5/0257 (2013.01); G01S 5/0284 (2013.01); G01S 7/484 (2013.01); G01S 7/4865 (2013.01); G01S 13/84 (2013.01); H04B 17/318 (2015.01)

(58) Field of Classification Search
CPC ........ G01S 11/08; G01S 5/0263; G01S 11/06; G01S 11/02; G01S 13/84; G01S 5/0257; G01S 5/0284; G01S 7/484; G01S 7/4865; H04B 17/318
See application file for complete search history.

(56) References Cited

U.S. PATENT DOCUMENTS

| | | | |
|---|---|---|---|
| 2014/0225762 A1* | 8/2014 | Seller ........................ | G01S 7/40 342/47 |
| 2015/0346332 A1 | 12/2015 | Taylor, Jr. et al. | |

(Continued)

OTHER PUBLICATIONS

Kluge: Ranging with IEEE 802.15.4 Narrow-Band PHY, Response to Call for Final Proposals, IEEE P802.15, Nov. 2009.

(Continued)

*Primary Examiner* — Olumide Ajibade Akonai
(74) *Attorney, Agent, or Firm* — McDonnell Boehnen Hulbert & Berghoff LLP

(57) ABSTRACT

A method for determining a distance between a first radio signal transceiver and a second radio signal transceiver using narrowband ranging comprises calculating a preliminary estimate of a value proportional to a one-way frequency domain channel response, based on measurements of signal phase and signal strength; calculating, for pairs of adjacent frequencies, an estimate of a value proportional to a time synchronization offset between a clock used by the first radio signal transceiver and a clock used by the second radio signal transceiver, and determining a final estimate of a value proportional to the one-way frequency domain channel response based on the preliminary estimate and adjacent estimates for the value proportional to the time synchronization offset, where the final estimate is used for the final distance determination.

13 Claims, 3 Drawing Sheets

(51) Int. Cl.
*G01S 13/84* (2006.01)
*G01S 7/484* (2006.01)
*G01S 7/4865* (2020.01)

(56) References Cited

U.S. PATENT DOCUMENTS

2016/0178744 A1 6/2016 Kluge et al.
2017/0033919 A1 2/2017 Sachse et al.
2018/0340777 A1* 11/2018 Zhang .................. G01C 21/165

OTHER PUBLICATIONS

Roy: IEEE Transactions on Acoustics, Speech, and Signal Processing, vol. 37, No. 7, Jul. 1989.
European Search Report, European Patent Application No. 17209014.4, dated Jul. 10, 2018, 9 pages.
Sarkar, Tapan K. et al., "Using the Matrix Pencil Method to Estimate The Parameters of a Sum of Complex Exponentials", IEEE Antennas and Propagation Magazine, vol. 37, No. 1, Feb. 1995, pp. 48-55.
Schmidt, Ralph O., "Multiple Emitter Location and Signal Parameter Estimation", IEEE Transactions on Antennas and Propagation, vol. AP-34, No. 3, Mar. 1986, pp. 276-280.

* cited by examiner

METHOD FOR DISTANCE DETERMINATION

CROSS-REFERENCE TO RELATED APPLICATIONS

The present application is a non-provisional patent application claiming priority to European Patent Application No. 17209014.4, filed on Dec. 20, 2017, the contents of which are hereby incorporated by reference.

FIELD OF THE DISCLOSURE

This disclosure relates to a method for determining a distance between first and second radio signal transceivers. It also relates to a computer-readable medium storing computer-readable instructions that when executed on a processing unit cause the processing unit to perform the method. The disclosure also relates to a radio signal transceiver configured to determine a distance to a second radio signal transceiver.

BACKGROUND

Some narrowband ranging methods for determining the distance between two radio transceivers are known. Often, narrowband systems use Received Signal Strength techniques, but there are also approaches also or alternatively comprising phase measurements for a number of different carriers (multi-carrier phase difference), as described, e.g., in: Kluge: Ranging with IEEE 802.15.4 Narrow-Band PHY, Response to Call for Final Proposals, IEEE P802.15, November 2009. For a final range determination, the results of such a measurement may be fed into an inverse fast Fourier transform (IFFT) algorithm or a so-called "super-resolution algorithm," for example as described in: Schmidt: IEEE Transactions on Antennas and Propagation, Vol AP-34, No. 3, pp. 276-280, March 1986; Sakar: IEEE Antennas and Propagation Magazine, Vol. 37, No. 1, pp. 48-55, February 1995; Roy: IEEE Transactions on Acoustics, Speech, and Signal Processing, Vol. 37, No. 7, July 1989.

SUMMARY

A potential benefit of the disclosure is to provide an improved narrowband-ranging method for determining the distance between two radio transceivers.

These and other potential benefits of the disclosure are at least partly met by the disclosure as defined in the independent claims. Other embodiments are set out in the dependent claims.

According to an aspect of the disclosure, there is provided a method for determining a distance between a first radio signal transceiver and a second radio signal transceiver, the method comprising: receiving a first set of measurement results and a second set of measurement results, wherein the first set of measurement results is acquired by the first radio signal transceiver based on signals transmitted from the second radio signal transceiver and the second set of measurement results is acquired by the second radio signal transceiver based on signals transmitted from the first radio signal transceiver and the first set of measurement results comprises, for each of a plurality of frequencies, a first measurement pair of a phase measurement and a signal strength measurement and the second set of measurement results comprises a phase measurement or optionally a second measurement pair of a phase measurement and a signal strength measurement; calculating, for each frequency of the plurality of frequencies, a preliminary estimate of a value proportional to a one-way frequency domain channel response, based on the measurement pair from the first set of measurement results and the phase measurement, or optionally the measurement pair, from the second set of measurement results; calculating, for pairs of adjacent frequencies, an estimate of a value proportional to a time synchronization offset between a clock used by the first radio signal transceiver and a clock used by the second radio signal transceiver, wherein the estimate for the value proportional to the time synchronization offset is based on, for each frequency in the pairs of adjacent frequencies, the phase of the calculated preliminary estimate of the value proportional to the one-way frequency domain channel response and the phase measurement, or optionally the measurement pair from the first set of measurement results and, optionally, a difference in frequency between the frequencies in the pair of adjacent frequencies; determining, for each frequency of the plurality of frequencies, a final estimate of a value proportional to the one-way frequency domain channel response based on the preliminary estimate and adjacent estimates for the value proportional to the time synchronization offset; and determining the distance between the first and the second radio signal transceiver based on the final estimates.

The term signal strength measurement should be understood to cover at least any measurement proportional to either the power or the amplitude of the received signal.

Receiving measurement results should be understood at least as either a device receiving results transmitted from a different device, or making use of measurement results already locally stored on the device.

This method can allow the distance determination to be based on the one-way frequency domain channel response. The one-way frequency domain channel response can otherwise be hard to reconstruct unambiguously, due to phase ambiguities introduced by the timing synchronization between the clocks at the two transceivers. This ambiguity can be resolved by the calculating of the estimate of a value proportional to the time synchronization offset as per the above.

The timing synchronization offset between the two clocks is typically expected to vary little between measurements. Therefore, using adjacent estimates for the timing synchronization offset provides extra information that can be used to correct the preliminary estimate of the value proportional to the one-way frequency domain channel response as per the above. Calculating the estimate of the value proportional to the time synchronization offset based, inter alia, on the preliminary estimate makes the estimate of the value proportional to the time synchronization offset sensitive to a wrong choice regarding the phase ambiguity of the preliminary estimate and may therefore signal that the phase of the preliminary estimate should be reversed for the final estimate.

Performing the distance determination based on the one-way frequency domain channel response can make the result less sensitive to interference from multi-path propagation, as the two-way frequency domain channel response will contain a large number of cross-products of one-way propagation modes, growing with the square of the number of propagation modes. Thus, there is provided a distance determination method that is generally less sensitive, i.e., less effected by multi-path effects.

The method may be performed in one of the transceivers, which may be receiving measurement results from the other transceiver in order to be able to use both the first set and the second set of measurement results in calculating the distance. However, it should also be realized that the method may be performed by any device, such as an external device possibly having more processing power than the first and the second transceivers. The external device may then receive the first and second sets of measurement results from the respective transceivers and may determine the distance between them. The external device may further communicate the determined distance to the transceivers.

According to one embodiment, the calculating of the preliminary estimate of a value proportional to the one-way frequency domain channel response comprises calculating an estimate of a value proportional to a two-way frequency domain channel response based on the measurement pair from the first set of measurement results and the measurement pair from the second set of measurement results; and calculating the preliminary estimate proportional to the one-way frequency domain channel response based on the estimate of the value proportional to the two-way frequency domain channel response.

First calculating the value proportional to a two-way frequency domain channel response based on the measurement pair has the potential benefit that the time synchronization offset between the two transceivers will naturally cancel out, since at a given frequency any measured phase shift due to this offset in one of the directions will act with opposite polarity to the other direction.

According to one embodiment, each measurement pair of the measurement pairs may be represented as a complex number, wherein the modulus of the complex number represents an amplitude corresponding to the signal strength measurement and the argument of the complex number represents the phase measurement; and the preliminary estimate and the final estimate each may be represented by complex numbers, wherein the modulus of the complex number represents an amplitude response and the argument of the complex number represents a phase response.

As is established convention in the field, a complex number representation provides a convenient notation for and convenient calculations related to periodically varying signals wherein, again according to established convention, the actual physical real-valued signal is represented by the real part of the corresponding complex number. However, as will be readily understood by the skilled person, any other suitable representation may be used when carrying out the actual calculations. In particular, when it is stated that a calculation "may be represented" as an operation involving one or more complex numbers, it will be understood to cover any mathematically equivalent calculation no matter the actual representation used.

According to one embodiment, the calculating of the estimate of the value proportional to a two-way frequency domain channel response comprises, or may be represented as comprising, multiplying the complex number representing the measurement pair from the first set of measurement results with the complex number representing the measurement pair from the second set of measurement results.

According to one embodiment, the calculating of the preliminary estimate of the value proportional to the one-way frequency domain channel response based on the estimate of the value proportional to the two-way frequency domain channel response comprises, or may be represented as comprising, taking a complex square root of the estimate proportional to the two-way frequency domain channel response. Taking a complex square root has an inherent $\pi$ (180-degree) phase ambiguity and one of the two possible solutions need to be selected. For example, according to one embodiment, when taking the square root, a solution with the phase between $-\pi/2$ and $\pi/2$ may be selected, i.e., the solution where the real part is positive.

According to one embodiment, the calculating of the estimate of the value proportional to the time synchronization offset for pairs of adjacent frequencies comprises, or may be represented as comprising, for each frequency in the pair of adjacent frequencies, taking the argument of a product of the complex number representing the measurement pair from the first set of measurement results and the complex conjugate of the complex number representing the preliminary estimate; and calculating a difference of the arguments; and optionally dividing the difference of the arguments by $2\pi$ times the difference in frequency between the frequencies in the pair of adjacent frequencies.

According to one embodiment, the determining of the final estimate of the value proportional to the one-way frequency domain channel response comprises for each estimate of the value proportional to the time synchronization offset, determining whether the estimate of the value proportional to the time synchronization offset differs, with respect to an adjacent estimate of the value proportional to the time synchronization offset, to a degree determined by a pre-determined value; and if such a difference has been determined, reversing the phase of the preliminary estimate and, optionally, of subsequent preliminary estimates, forming the final estimate.

Determining whether the estimate of the value proportional to the time synchronization offset differs, with respect to an adjacent estimate of the value proportional to the time synchronization offset, to a degree determined by a pre-determined value should not be understood as strictly only comprising a subtraction of values, but rather to comprise any suitable method comprising, but not being limited to, subtraction, division, or comparison. The pre-determined value will then be chosen to be compatible with the scheme used, all within the scope of the disclosure.

According to one embodiment, the pre-determined value, if represented as expressed in relation to the time synchronization offset, is half the inverse of the difference in frequency. This is the jump that the estimated time synchronization offset is expected to make if the wrong phase solution has been chosen for the preliminary estimate. If, to the contrary, no such jump is observed, no correction of the preliminary estimate is needed. Thus, expressed with relation to a difference between adjacent estimates of the timing offset, either a difference close to zero, or a difference with an absolute value in the order of half the inverse of the difference in frequency is expected, accounting for measurement uncertainties. If, for example, instead expressed in relation to dividing adjacent estimates of the timing offset, either a value close to one or a value close to ½ or 2 is expected.

According to one embodiment, the determining of the distance between the first and the second radio signal transceiver uses an algorithm based on IFFT and/or a super-resolution algorithm.

According to another aspect of the disclosure, there is provided a computer-readable medium storing computer-readable instructions that when executed on a processing unit will cause the processing unit to perform the method above.

Effects and features of this aspect are largely analogous to those described above.

According to another aspect of the disclosure, there is provided a radio signal transceiver configured to determine a distance to a second radio signal transceiver, the radio signal transceiver comprising a measurement unit configured to acquire a first set of measurement results based on signals transmitted from the second radio signal transceiver, the first set of measurement results comprising, for each of a plurality of frequencies, a measurement pair of a phase measurement and a signal strength measurement; a receiver configured to receive a second set of measurement results acquired by the second radio signal transceiver based on signals transmitted from the first radio signal transceiver, the second set of measurement results comprising, for each of a plurality of frequencies, a measurement pair of a phase measurement and a signal strength measurement; and a processing unit configured to calculate for each frequency of the plurality of frequencies, a preliminary estimate of a value proportional to a one-way frequency domain channel response, based on the measurement pair from the first set of measurement results and the measurement pair from the second set of measurement results; calculate for pairs of adjacent frequencies, an estimate of a value proportional to a time synchronization offset between a clock used by the first radio signal transceiver and a clock used by the second radio signal transceiver, wherein the estimate for the time synchronization offset is based on, for each frequency in the pairs of adjacent frequencies, the calculated preliminary estimate of the value proportional to the one-way frequency domain channel response and the measurement pair from the first set of measurement results and, optionally, a difference in frequency between the frequencies in the pair of adjacent frequencies; determine for each frequency of the plurality of frequencies, a final estimate of a value proportional to the one-way frequency domain channel response based on the preliminary estimate and adjacent estimates for the value proportional to the time synchronization offset; and determine the distance between the first and the second radio signal transceiver based on the final estimates.

Effects and features of this aspect are largely analogous to those described above.

Thus, a radio signal transceiver may be able to determine a distance to a second radio signal transceiver in a robust manner. In a pair of radio signal transceivers performing measurements, one of the radio signal transceivers may perform calculations to determine the distance between the transceivers. This transceiver may then communicate the determined distance to the other transceiver.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Some embodiments involve using the multicarrier phase difference (MCPD) ranging principle, for a range determination, i.e., a distance determination, between a first radio signal transceiver device A and a second radio signal transceiver device B. Embodiments also involve using as input a first set of measurement results and a second set of measurement results, wherein the first set of measurement results is acquired by the first radio signal transceiver device A based on signals transmitted from the second radio signal transceiver device B, and the second set of measurement results is acquired by the second radio signal transceiver device B based on signals transmitted from the first radio signal transceiver. In embodiments, each set of measurement results comprises, for each of a plurality of frequencies, a measurement pair of a phase measurement and a signal strength measurement.

Acquisition of the measurement results can start with the two devices A and B syncing the ranging parameters, aligning their frequencies (e.g. using carrier frequency offset (CFO) estimation and calibration) and realizing course time synchronization. That is, both A and B can start a (digital) counter or clock at the transmission/reception of a start frame delimiter (SFD) which both devices A and B use to control a local state machine. The state machine can control the transceivers.

Figure 1:
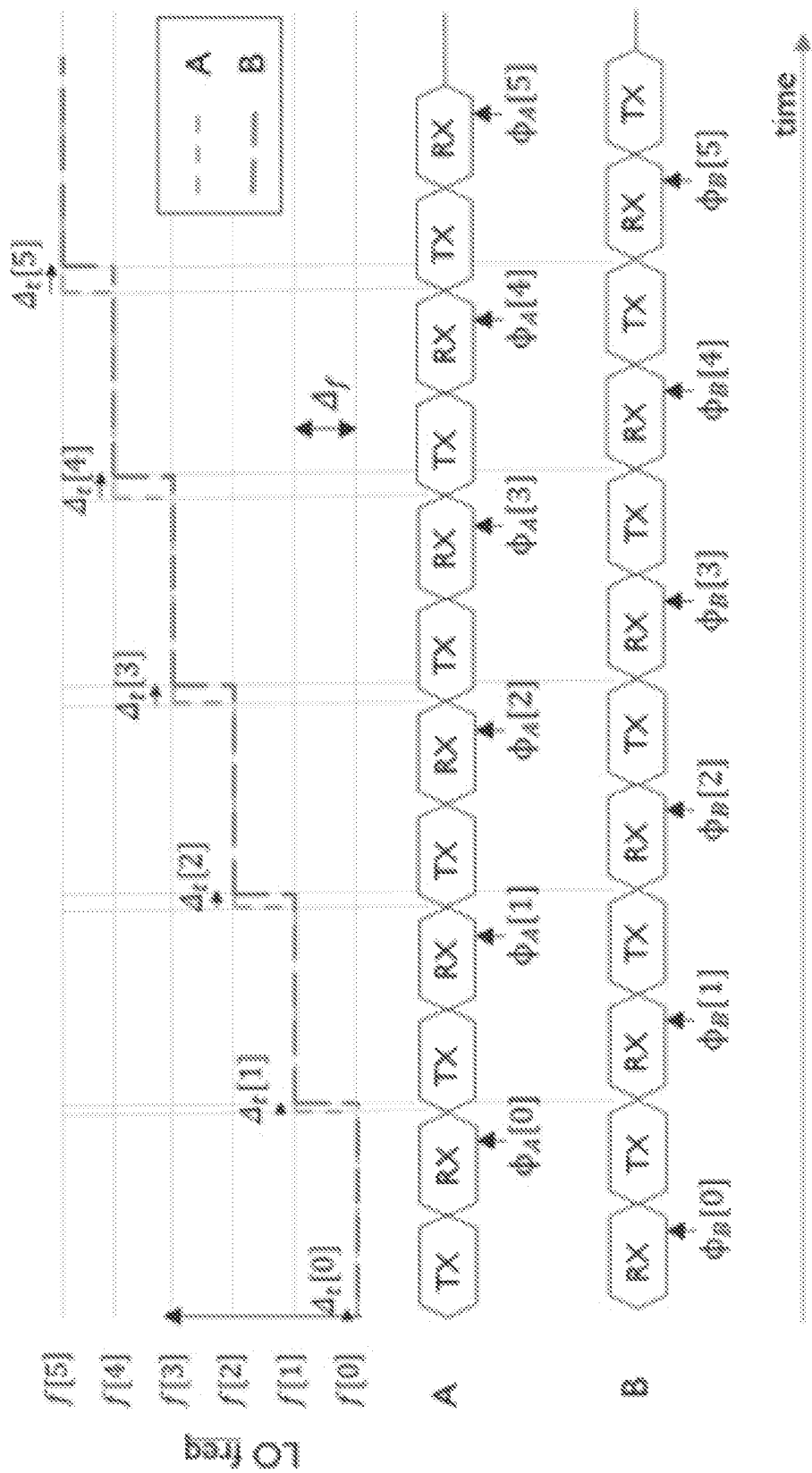
FIG. 1 is an illustration of local oscillator (LO) frequencies and a state of transceivers A and B with respect to time, according to an embodiment.

As illustrated in FIG. 1, the measurements can be performed according to the following acts.

Act 0: Device A and Device B set their local oscillator (LO) to a predetermined frequency and set the loop counter to k=0. Act 1: Device A transmits its LO and Device B performs a phase measurement ($\phi_B[k]$). Further, device B can perform a received signal strength indication measurement $RSSI_B[k]$ (not shown). Act 2: Device A and B can change transmit direction, allowing a guard time for stabilizing the LO. Act 3: Device B transmits its LO and Device A performs a phase measurement ($\phi_A[k]$). Further, device A can perform a received signal strength indication measurement $RSSI_A[k]$ (not shown). Act 4: Device A and Device B increase their LO frequency by a predetermined interval $\Delta_f$ and go back to Act 1. This loop is repeated a predetermined number times ($K_f$).

Both device A and device B have a continuously running phase-locked loop (PLL) to generate their respective local oscillator (LO) signals. When switching from transmit to receive modes or vice-versa, the PLLs remain on to allow for continuous phase signals.

Figure 3:
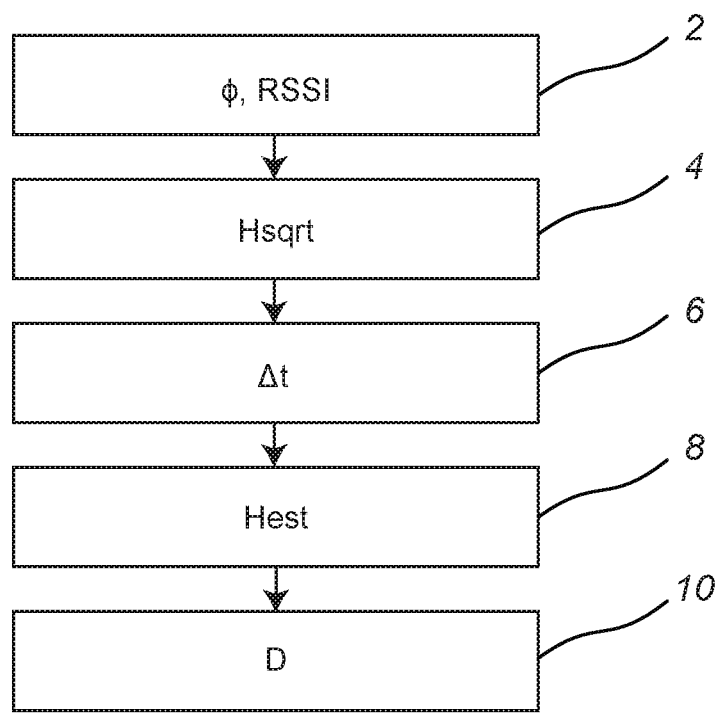
FIG. 3 is a flowchart of a method, according to an embodiment.

FIG. 3 summarizes steps of a method. In block 2 of FIG. 3, once the measurements have been carried out, the method for determining the distance is somewhat insensitive to time. Therefore, computations can be performed on a third device/entity with more processing power than Device A or Device B, which is, e.g., in the cloud, assuming the entity has access to the measurement data from both transceivers. Thus, the method may either be performed via device A and/or device B, but may also be performed via a third Device C, which can then calculate the distance between A and B, where device C may be in the cloud. In some embodiments, instead of performing computations, a device can transmit, or cause to be transmitted, its measurement results to the device that is to carry out the computations. Thus, for example, if the computations are to be carried out on device C, device B may transmit a frame with its phase measurements to Device C ($\phi_B[0:K_f-1]$) and device A may transmit a frame with all its phase measurements to Device C ($\phi_A[0:K_f-1]$). Similarly, the RSSI measurements $RSSI_A[0:K_f-1]$ and optionally $RSSI_B[0:K_f-1]$ can be transmitted to the device carrying out the method, for example, device C. Thus, the device carrying out the method receives the first set of measurement results, comprising $\phi_A[0:K_f-1]$ and $RSSI_A[0:K_f-1]$ and the second set of measurement results, comprising $\phi_B[0:K_f-1]$ and, optionally, $RSSI_B[0:K_f-1]$.

Alternatively, device A will carry out the method and may then comprise a measurement unit configured to acquire the first set of measurement results based on signals transmitted from the second radio signal transceiver, i.e., device B, as per the above. It may further comprise a receiver configured to receive the second set of measurement results acquired by the second radio signal transceiver, i.e., device B, based on signals transmitted from the first radio signal transceiver, i.e., device A. Further, device A may comprise a processing unit for carrying out the steps of the method, as will be described below.

For each frequency and set of measurements, a complex number may be formed, proportional to the one-way frequency domain response, where the modulus represents an amplitude corresponding to the signal strength measurement and the argument of the complex number represents the phase measurement:

$$H_A[k]=A_A[k]\exp(j\phi_A[k])$$

$$H_B[k]=A_B[k]\exp(j\phi_B[k])$$

$A_A[k]$ and $A_B[k]$ are values proportional to signal amplitude, obtainable, for example, by taking the square root of the corresponding RSSI values.

In the absence of thermal noise or phase-noise, these measured magnitudes and phases at the kth frequency are related to the actual channel responses H[k] as follows $$H_A[k] \propto H[k]\exp(j2\pi f[k]\Delta_t[k])$$

where $\Delta_t[k]$ denotes the time-offset between A and B during the measurement of the k-th frequency and the symbol $\propto$ denotes proportionality, i.e., a[k] $\propto$ b[k] means that a[k]=c*b[k] for all values of k, where c is an unknown complex-value, but the same for all k. The timing offset $\Delta_t[k]$ can change from measurement to measurement due to clock-drift and jitter, but the offset will only change slowly from measurement to measurement. Similarly, device B can measure $$H_B[k] \propto H[k]\exp(-j2\pi f[k]\Delta_t[k])$$

In block 4 of FIG. 3, an estimate X[k] of a value proportional to a two-way frequency domain channel response can be formed by multiplying the two values together, thereby canceling out the factors related to the timing offset, since, as the measurements at A and B are taken shortly after each other, we may assume that $\Delta_t[k]$ did not change during that time.

$$X[k]=H_A[k]H_B[k] \propto (H[k])^2$$

Thus, the calculation of the estimate of a value proportional to the two-way frequency domain channel response is based on the measurement pair from the first set of measurement results and the measurement pair from the second set of measurement results. Moreover, it comprises, or may be represented as comprising, multiplying the complex number representing the measurement pair from the first set of measurement results with the complex number representing the measurement pair from the second set of measurement results.

Alternatively, X[k] may, regarding amplitude, be calculated based on the measurement at device A only:

$$X[k]=\|H_A[k]\|^2 \exp(\phi_A[k]+\phi_B[k]) \propto (H[k])^2$$

where $\| \|^2$ denotes the absolute squared-operator. Note that $\|H_A[k]\|^2$ is equal to the $RSSI_A[k]$.

Thus, in this example, calculating the estimate of a value proportional to the two-way frequency domain channel response is based on the measurement pair from the first set of measurement results and the phase measurement from the second set of measurement results.

In the following, the one-way frequency-domain channel response H[k] will be reconstructed using a) X[k] and b) side-information from the captured phase measurements $\phi_A[k]$ and [k].

A preliminary estimate $H_{sqrt}[k]$ of the one-way frequency domain channel response H [k] is calculated by taking the square root of the estimate proportional to the two-way frequency domain channel response X[k]:

$$H_{sqrt}[k]=\sqrt{X[k]} \propto c[k]H[k]$$

which is related to the true one-way frequency-domain channel response according to the proportionality above, where c[k] is either +1 or −1, caused by the inherent phase ambiguity of taking a complex square root. To estimate the values of c[k], we use that fact that the time-offset generally cannot change rapidly. For the preliminary estimate, solutions with the phase between $-\pi/2$ and $\pi/2$ may be selected, i.e., solutions a positive real part may be selected. To resolve the ambiguity, it is proposed to use side-information, namely that the time-offset between A and B only changes slowly during the procedure, as will be explained in the following.

Thus, for each frequency, the preliminary estimate of the value proportional to the one-way frequency domain channel response is calculated based on the measurement pair from the first set of measurement results and the phase measurement, or optionally the measurement pair from the second set of measurement results.

In block 6 of FIG. 3, we can now estimate the value of the time measurement offset $\Delta_t$ with an ambiguity equal to $\Delta_f^{-1}$. The estimate for $\Delta_t$ for a frequency with index k is calculated as $$\hat{\Delta}_t[k] = \frac{\angle(H_A[k+1]H_{sqrt}^*[k+1]) - \angle(H_A[k]H_{sqrt}^*[k])}{2\pi\Delta_f}$$

where $\angle$ denotes taking the argument of the complex number. The estimated $\hat{\Delta}_t[k]$ should be approximately the same for all k.

As only the argument/phase of $H_A$ is used, the magnitude of this value may be omitted from the calculation, only using the argument of $H_A$. If, e.g., the frequency spacing is constant, the division operation may be skipped. Thus, for pairs of adjacent frequencies, the estimate of the value proportional to the time synchronization offset between the clock used by the first radio signal transceiver and the clock used by the second radio signal transceiver is based on, for each frequency in the pairs of adjacent frequencies, the phase of the calculated preliminary estimate of the value proportional to the one-way frequency domain channel response and the phase measurement, or optionally the measurement pair, from the first set of measurement results and, optionally, the difference in frequency between the frequencies in the pair of adjacent frequencies. Further, it is calculated by taking the argument of the product of the complex number representing the measurement pair from the first set of measurement results and the complex conjugate of the complex number representing the preliminary estimate and calculating the difference of the arguments and optionally by dividing the difference of the arguments by $2\pi$ times the difference in frequency between the frequencies in the pair of adjacent frequencies.

In block 8 of FIG. 3, if the estimate $\hat{\Delta}_t[k]$ makes a jump in the order of $\frac{1}{2}\Delta_f^{-1}$ between adjacent frequencies this indicates an incorrect sign-change in the preliminary estimate $H_{sqrt}[k]$ and therefore all values $H_{sqrt}[k]$ with k≥m should be multiplied by −1. If two jumps are observed at say m and n with m<n, the values between m≤k<n are multiplied by −1 and the remainder by $(-1)^2=1$. For three or more jumps, the procedure is simply extended. To limit the number of multiplication operations performed, first a mask can be created to keep track of which values should be additively inverted and which should not. The mask will be indicated by č[k]. The final estimate of the one-way frequency domain channel response will now be $$H_{est}[k]=č[k]H_{sqrt}[k]\propto H[k]$$

Thus, for each frequency, a final estimate of a value proportional to the one-way frequency domain channel response is determined based on the preliminary estimate and adjacent estimates for the value proportional to the time synchronization offset. Further, for each estimate of the value proportional to the time synchronization offset, it is determined whether it differs, with respect to an adjacent estimate of the value proportional to the time synchronization offset, to a degree determined by a pre-determined value and if such a difference has been determined, the phase of the preliminary estimate and, optionally, of subsequent preliminary estimates, is reversed to form the final estimate of the one-way frequency-domain channel response.

Finally, in block 10 of FIG. 3, the distance between the first and the second radio signal transceivers may be determined based on the final estimates. E.g., an inverse fast Fourier transform (IFFT) or other signal processing techniques typically referred to as super-resolution algorithms can be used. The reconstructed one-way frequency-domain channel response H[k] allows most ranging algorithms to mitigate more interference from multipath, as the order of the problem/number of components is reduced. In the presence of multipath, the number of components interfering with the estimation of the delay of the line-of-sight (LOS) component will be reduced and ranging and localization will be more accurate.

A computer program product comprising a computer-readable medium may store computer-readable instructions such that when executed on a processing unit the computer program product will cause the processing unit to perform the method according to the above.

The method may be performed in a processing unit, which may be part of a device A, B, or C as discussed above.

The processing unit may be implemented in hardware, or as any combination of software and hardware. At least part of the functionality of the processing unit may, for instance, be implemented as software being executed on a general-purpose computer. The system may thus comprise one or more processing units, such as a central processing unit (CPU), which may execute the instructions of one or more computer programs in order to implement desired functionality.

The processing unit may alternatively be implemented as firmware arranged e.g. in an embedded system, or as a specifically designed processing unit, such as an Application-Specific Integrated Circuit (ASIC) or a Field-Programmable Gate Array (FPGA).

The following discussion will serve to show why the two-way frequency-domain channel response (TWFDCR) X[k] is typically more sensitive to multi-path effects than the one-way frequency-domain channel response. The issue with X[k] is that it does not contain just the radio components, but also many cross-products. In this discussion, X[k] is defined as $$X[k]=(H[k])^2$$

where $H[k]=\Sigma_{l=0}^L \alpha_l \exp(-j2\pi f[k]\tau_l)$ i.e., the TWFDCR X[k] is the square of the one-way frequency channel response H[k].

In other words, the radio channel is the sum of L components (LOS and reflections/multipath), where each component has a certain complex-amplitude $\alpha_l$ and delay $\tau_l$. Without loss of generality, we state that l=0 denotes the LOS component. In the end, the aim is to estimate the delay of the LOS component and the other components interfere with the estimation. If we substitute this into the equation for X[k]

$$X[k]=(H[k])^2=\Sigma_{l_1=0}^L\Sigma_{l_2=0}^L \alpha_{l_1}\alpha_{l_2}\exp(-j2\pi f[k](\tau_{l_1}+\tau_{l_2}))$$

In other words, X[k] is the sum of K<$L^2$ complex exponentials. Although it can be simplified to some extent, the number of combinations is still approximately $\frac{1}{2}L^2$. In other words, the number of components interfering with the estimation increases with the power of 2 with the number of paths/components.

Figure 2:
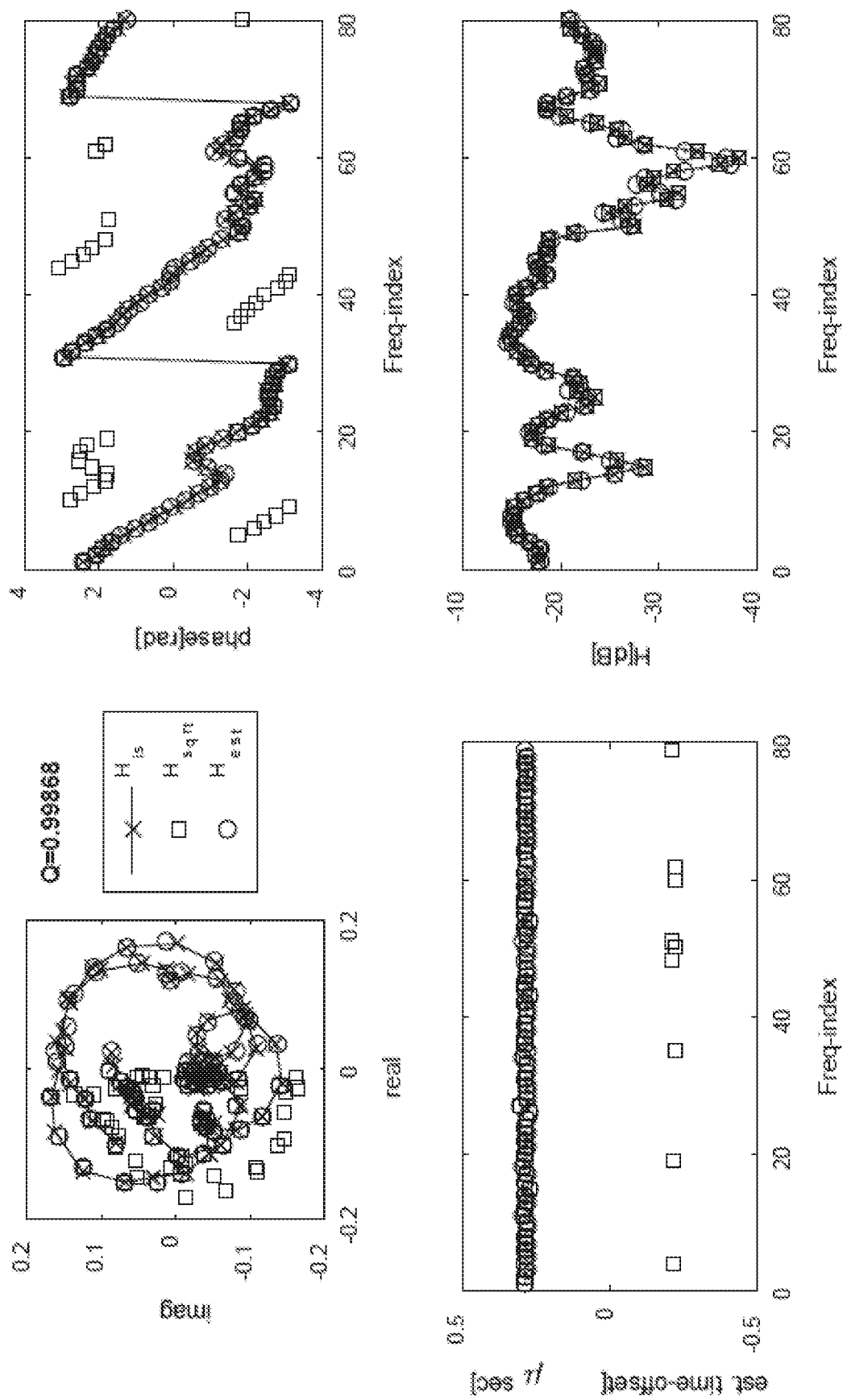
FIG. 2 depicts a method, according to an embodiment.

To illustrate the operation of the algorithm, i.e., method, it was applied on a measured channel. The channel was measured at 80 different frequencies with a frequency step size of 1 MHz, corresponding to frequency indices k. The results are depicted in FIG. 2. The true one-way frequency-domain channel response (1WFDCR) H[k] is depicted by a solid line, the preliminary estimate $H_{sqrt}[k]$ is depicted by squares. Note that H[k] and $H_{sqrt}[k]$ have a different phase (upper-right subfigure) for the frequency indices 5-19, 37-49, 53, 61-62, and 80. In the low-left sub-figure, the estimated time-offset $\Delta_{t,est}$ is depicted. Notice that the estimated time-offset is constant, except when an interval with an incorrect phase starts or ends. Also note that the time-offset jump has a magnitude equal to 0.5 microseconds, as expected.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for determining a distance between a first radio signal transceiver and a second radio signal transceiver, the method comprising:
receiving or determining a first set of measurement results and a second set of measurement results, wherein the first set of measurement results represent signals transmitted by the second radio signal transceiver and received by the first radio signal transceiver and the second set of measurement results represent signals transmitted by the first radio signal transceiver and received by the second radio signal transceiver, the first set of measurement results comprising, for each of a plurality of frequencies, a measurement pair of a phase measurement and a signal strength measurement, and the second set of measurement results comprising, for each of the plurality of frequencies, (i) a phase measurement or (ii) a measurement pair of a phase measurement and a signal strength measurement;

calculating, for each frequency of the plurality of frequencies, a preliminary estimate of a value proportional to a one-way frequency domain channel response, based on the measurement pair from the first set of measurement results and (i) the phase measurement from the second set of measurement results or (ii) the measurement pair from the second set of measurement results;

calculating, for pairs of adjacent frequencies of the plurality of frequencies, an estimate of a value proportional to a time synchronization offset between a clock used by the first radio signal transceiver and a clock used by the second radio signal transceiver, wherein the estimate for the value proportional to the time synchronization offset is based on, for each frequency in the pairs of adjacent frequencies, the phase of the calculated preliminary estimate of the value proportional to the one-way frequency domain channel response and the phase measurement or the measurement pair from the first set of measurement results or a difference in frequency between the frequencies in the pair of adjacent frequencies;

determining, for each frequency of the plurality of frequencies, a final estimate of a value proportional to the one-way frequency domain channel response based on the preliminary estimate and adjacent estimates for the value proportional to the time synchronization offset; and determining the distance between the first radio signal transceiver and the second radio signal transceiver based on the final estimates corresponding to the plurality of frequencies.

2. The method according to claim 1, wherein the calculating of the preliminary estimate of a value proportional to the one-way frequency domain channel response comprises:

calculating an estimate of a value proportional to a two-way frequency domain channel response based on the measurement pair from the first set of measurement results and (i) the phase measurement or (ii) the measurement pair from the second set of measurement results; and calculating the preliminary estimate proportional to the one-way frequency domain channel response based on the estimate of the value proportional to the two-way frequency domain channel response.

3. The method according to claim 1, wherein:

each measurement pair of the measurement pairs is represented as a complex number, wherein the modulus of the complex number represents an amplitude corresponding to the signal strength measurement and the argument of the complex number represents the phase measurement; and the preliminary estimates and the final estimates may be represented by complex numbers, wherein the modulus of the complex number represents an amplitude response and the argument of the complex number represents a phase response.

4. The method according to claim 3, wherein the calculating of the estimate of the value proportional to a two-way frequency domain channel response comprises multiplying the complex number representing the measurement pair from the first set of measurement results with the complex number representing the measurement pair from the second set of measurement results.

5. The method according to claim 3, wherein the calculating of the preliminary estimate of the value proportional to the one-way frequency domain channel response based on the estimate of the value proportional to the two-way frequency domain channel response comprises taking a complex square root of the estimate proportional to the two-way frequency domain channel response.

6. The method according to claim 5, wherein, when during the taking of the square root, a solution with a phase between $-\pi/2$ and $\pi/2$ is selected.

7. The method according to claim 3, wherein the calculating of the estimate of the value proportional to the time synchronization offset for pairs of adjacent frequencies comprises:

for each frequency in the pair of adjacent frequencies, taking the argument of a product of the complex number representing the measurement pair from the first set of measurement results and the complex conjugate of the complex number representing the preliminary estimate; and calculating a difference of the arguments.

8. The method of claim 7, further comprising dividing the difference of the arguments by $2\pi$ times the difference in frequency between the frequencies of the pair of adjacent frequencies.

9. The method according to claim 1, wherein the determining of the final estimate of the value proportional to the one-way frequency domain channel response comprises:

for each estimate of the value proportional to the time synchronization offset, determining that the estimate of the value proportional to the time synchronization offset differs, with respect to an adjacent estimate of the value proportional to the time synchronization offset, at least by a degree determined by a pre-determined value; and reversing the phase of the preliminary estimate.

10. The method according to claim 9, wherein the pre-determined value is half the inverse of the difference in frequency.

11. The method according to claim 1, wherein determining of the distance between the first radio signal transceiver and the second radio signal transceiver comprises using an algorithm based on IFFT and/or a super-resolution algorithm.

12. A non-transitory computer-readable medium storing computer-readable instructions that when executed on a processing unit cause the processing unit to perform the method according to claim 1.

13. A first radio signal transceiver configured to determine a distance to a second radio signal transceiver, the first radio signal transceiver comprising:

a measurement unit configured to acquire a first set of measurement results based on signals transmitted from the second radio signal transceiver, the first set of measurement results comprising, for each of a plurality of frequencies, a measurement pair of a phase measurement and a signal strength measurement;

a receiver configured to receive a second set of measurement results acquired by the second radio signal transceiver based on signals transmitted from the first radio signal transceiver, the second set of measurement results comprising, for each of the plurality of frequencies, (i) a phase measurement or (ii) a measurement pair of a phase measurement and a signal strength measurement; and a processing unit configured to:

calculate for each frequency of the plurality of frequencies, a preliminary estimate of a value proportional to a one-way frequency domain channel response, based on the phase measurement or the measurement pair from the first set of measurement results and the measurement pair from the second set of measurement results;

calculate for pairs of adjacent frequencies of the plurality of frequencies, an estimate of a value proportional to a time synchronization offset between a clock used by the first radio signal transceiver and a clock used by the second radio signal transceiver, wherein the estimate for the value proportional to the time synchronization offset is based on, for each frequency in the pairs of adjacent frequencies, the phase of the calculated preliminary estimate of the value proportional to the one-way frequency domain channel response and the phase measurement or the measurement pair from the first set of measurement results or a difference in frequency between the frequencies in the pair of adjacent frequencies;

determine for each frequency of the plurality of frequencies, a final estimate of a value proportional to the one-way frequency domain channel response based on the preliminary estimate and adjacent estimates for the value proportional to the time synchronization offset; and determine the distance between the first radio signal transceiver and the second radio signal transceiver based on the final estimates corresponding to the plurality of frequencies.

* * * * *